(12) United States Patent
Avery, Jr. et al.

(10) Patent No.: US 6,708,104 B2
(45) Date of Patent: Mar. 16, 2004

(54) ENGINE CONTROL BASED ON EXHAUST BACK PRESSURE

(75) Inventors: Richard Michael Avery, Jr., West Bloomfield, MI (US); Matthew Thomas Baird, Northville, MI (US); Brian Andrew Lewallen, Canton, MI (US); Tomislav Golub, Birmingham, MI (US); Peter Zagone, Huntington Woods, MI (US)

(73) Assignee: Detroit Diesel Corporation, Detroit, MI (US)

( * ) Notice: Subject to any disclaimer, the term of this patent is extended or adjusted under 35 U.S.C. 154(b) by 311 days.

(21) Appl. No.: 09/916,975

(22) Filed: Jul. 27, 2001

(65) Prior Publication Data

US 2003/0023367 A1 Jan. 30, 2003

(51) Int. Cl.⁷ .............................................. F02M 25/06
(52) U.S. Cl. ........................ 701/110; 701/114; 701/108
(58) Field of Search ................................ 701/110, 114, 701/102, 108, 109; 123/435, 436, 350, 690, 681, 679; 73/117.3, 116, 118.1

(56) References Cited

U.S. PATENT DOCUMENTS

| | | | | |
|---|---|---|---|---|
| 4,186,703 A | * | 2/1980 | Haka et al. | ................. 123/676 |
| 4,302,814 A | | 11/1981 | Full et al. | |
| 4,397,289 A | * | 8/1983 | Haka et al. | ................. 123/676 |
| 4,399,798 A | * | 8/1983 | Stoltman | ..................... 123/676 |
| 4,756,155 A | * | 7/1988 | Shinzawa | ..................... 60/285 |
| 4,884,398 A | | 12/1989 | Morita et al. | |
| 5,065,575 A | * | 11/1991 | Cook et al. | ................... 60/290 |
| 5,261,271 A | | 11/1993 | Bihn et al. | |
| 5,349,936 A | | 9/1994 | Uchinami | |
| 5,458,673 A | | 10/1995 | Kojima et al. | |
| 5,682,867 A | | 11/1997 | Katoh et al. | |
| 5,738,706 A | | 4/1998 | Swanander et al. | |
| 5,972,075 A | | 10/1999 | Fukuda et al. | |
| 6,003,379 A | | 12/1999 | Ichikawa et al. | |
| 6,010,547 A | | 1/2000 | Jeong et al. | |
| 6,019,094 A | | 2/2000 | Itoyama | |
| 6,035,639 A | | 3/2000 | Kolmanovsky et al. | |
| 6,044,826 A | | 4/2000 | Bayerle et al. | |
| 6,067,032 A | | 5/2000 | Anderson, Jr. et al. | |
| 6,067,800 A | | 5/2000 | Kolmanovsky et al. | |
| 6,073,653 A | | 6/2000 | Nishio et al. | |
| 6,138,504 A | | 10/2000 | Lewis et al. | |

FOREIGN PATENT DOCUMENTS

| | | | | |
|---|---|---|---|---|
| JP | 61-135917 | * | 6/1989 | ............. F01N/3/02 |
| JP | 8-284764 | * | 10/1996 | ........... F02M/25/07 |
| JP | 10-131792 | * | 5/1998 | ............ F02D/41/14 |

* cited by examiner

*Primary Examiner*—Hieu T. Vo
(74) *Attorney, Agent, or Firm*—Brooks Kushman P.C.

(57) ABSTRACT

A system and method for controlling an internal combustion engine monitor exhaust back pressure and take remedial action when the exhaust back pressure exceeds a corresponding threshold. The system and method respond to increased exhaust back pressures attributable to various causes to alert the vehicle operator and/or engage engine protection mechanisms depending on the back pressure severity level in an effort to avoid engine/component damage. Fault timers are provided for tracking time fault conditions are present and time that faults are active, with active faults being latched for the current ignition cycle. Available engine torque may be reduced in response to excessive exhaust back pressure. Anti-tampering logic is provided to detect attempts to defeat the protection feature.

30 Claims, 4 Drawing Sheets

ENGINE CONTROL BASED ON EXHAUST BACK PRESSURE

BACKGROUND OF THE INVENTION

1. Field of the Invention

The present invention relates to a system and method for controlling an internal combustion engine based on exhaust back pressure.

2. Background Art

A number of strategies have been developed to reduce emissions for truck, automotive, and stationary engines used in power plants. In addition to controlling the basic combustion process using an electronic control module to balance trade-offs between performance and emissions, emission control devices are often placed in the exhaust stream to reduce or eliminate the byproducts of incomplete combustion. A particulate trap or filter is an emission control device placed in the exhaust stream to reduce particulate emissions, which are primarily carbon particles or soot. As more particulates accumulate in the filter or trap, the increasing restriction to exhaust flow results in a gradual increase in exhaust back pressure, i.e. the pressure within the exhaust upstream of the filter. If the trap is not properly maintained or if engine conditions prevent the trap from being regenerated, the exhaust back pressure may increase to a point which could jeopardize engine component life.

Exhaust back pressure may be affected by engine components other than emission control devices. For example, exhaust back pressure may be controlled to achieve a desired EGR flow using a turbocharger, such as a variable geometry turbocharger (VGT). Likewise, exhaust back pressure may be controlled to modulate engine braking. As such, any anomalous operation of various engine components may result in a gradual or sudden increase in exhaust back pressure which could be detrimental to a number of engine components.

SUMMARY OF THE INVENTION

An object of the present invention is to provide a system and method for controlling an engine to reduce or prevent component damage from excessive exhaust back pressure.

Another object of the present invention is to provide a system and method for monitoring a particulate trap or filter using a pressure sensor to monitor exhaust pressure and reduce available engine torque when the exhaust pressure exceeds a predetermined or adaptable threshold.

A further object of the present invention is to provide a system and method for detecting tampering with an emission control device.

An additional object of the present invention is to provide a system and method for alerting an operator and/or maintenance personnel to an increased exhaust pressure so corrective action can be initiated before component damage occurs.

In carrying out the above objects and other objects, features, and advantages of the present invention, a system and method for controlling an internal combustion engine include monitoring exhaust pressure and reducing engine output when the exhaust pressure exceeds a threshold to reduce or prevent engine component damage from excessive exhaust pressure. In one embodiment, the exhaust pressure is monitored to detect tampering with a component in the emission control system, such as a pressure sensor or particulate trap or filter, for example.

The present invention provides a number of advantages relative to the prior art. For example, the present invention monitors exhaust pressure to reduce or prevent damage to engine components due to excessive pressure, rather than simply indicating that the particulate filter or trap may be plugged. In one embodiment, the present invention preferably warns the operator when exhaust back pressure exceeds a first threshold to provide an opportunity to take corrective action. If the condition is not corrected, available engine torque is reduced, which provides an increased incentive for the operator to remedy the problem before significant damage occurs. Furthermore, reducing engine output as back pressure increases is self-correcting in that the lower engine output has an associated lower pressure, which in turn reduces the likelihood of component damage.

The above advantages, and other advantages, objects, and features of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
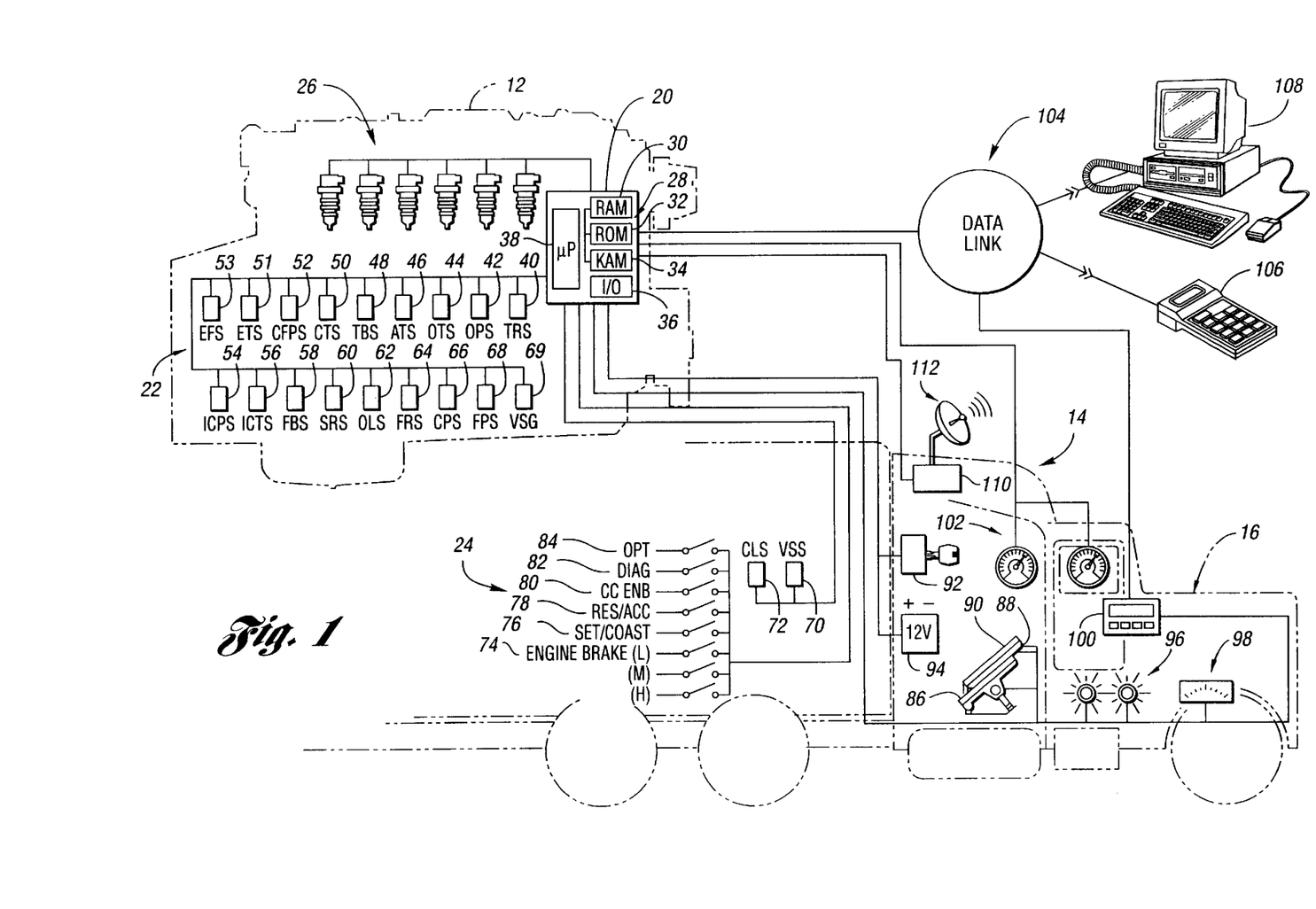
FIG. 1 is a block diagram illustrating one application of a system or method for controlling an engine in response to exhaust back pressure according to one embodiment of the present invention.

FIG. 1 provides a schematic/block diagram illustrating operation of a system or method for controlling an engine based on exhaust back pressure to reduce or prevent component damage in a representative application according to one embodiment of the present invention. System 10 includes a multi-cylinder compression ignition internal combustion engine, such as a diesel engine 12, which may be installed in a vehicle 14 depending upon the particular application. In one embodiment, vehicle 14 includes a tractor 16 and semi-trailer 18. Diesel engine 12 is installed in tractor 16 and interfaces with various sensors and actuators located on engine 12, tractor 16, and semi-trailer 18 via engine and vehicle wiring harnesses as described in further detail below. In other applications, engine 12 may be used to operate industrial and construction equipment, or in stationary applications for driving generators, compressors, and/or pumps and the like. While the present invention is described with reference to a diesel engine, one of ordinary skill in the art will recognize that the present invention is not necessarily limited to compression ignition engines and may be easily applied to a variety of internal combustion engine technologies.

An electronic engine control module (ECM) 20 receives signals generated by engine sensors 22 and vehicle sensors 24 and processes the signals to control engine and/or vehicle actuators such as fuel injectors 26. ECM 20 preferably includes computer-readable storage media, indicated generally by reference numeral 28 for storing data representing instructions executable by a computer to control engine 12. Computer-readable storage media 28 may also include calibration information in addition to working variables, parameters, and the like. In one embodiment, computer-readable storage media 28 include a random access memory (RAM) 30 in addition to various non-volatile memory such as read-only memory (ROM) 32, and keep-alive or non-volatile memory (KAM) 34. Computer-readable storage media 28 communicate with a microprocessor 38 and input/output (I/O) circuitry 36 via a standard control/address bus. As will be appreciated by one of ordinary skill in the art, computer-readable storage media 28 may include various types of physical devices for temporary and/or persistent storage of data which includes solid state, magnetic, optical, and combination devices. For example, computer readable storage media 28 may be implemented using one or more physical devices such as DRAM, PROMS, EPROMS, EEPROMS, flash memory, and the like. Depending upon the particular application, computer-readable storage media 28 may also include floppy disks, CD ROM, and the like.

In a typical application, ECM 20 processes inputs from engine sensors 22, and vehicle sensors/switches 24 by executing instructions stored in computer-readable storage media 28 to generate appropriate output signals for control of engine 12. In one embodiment of the present invention, engine sensors 22 include a timing reference sensor (TRS) 40 which provides an indication of the crankshaft position and may be used to determine engine speed. An oil pressure sensor (OPS) 42 and oil temperature sensor (OTS) 44 are used to monitor the pressure and temperature of the engine oil, respectively.

An air temperature sensor (ATS) 46 is used to provide an indication of the current intake air temperature. A turbo boost sensor (TBS) 48 is used to provide an indication of the boost pressure of a turbocharger which is preferably a variable geometry or variable nozzle turbocharger as described in greater detail below. Coolant temperature sensor (CTS) 50 is used to provide an indication of the coolant temperature. Depending upon the particular engine configuration and application, various additional sensors may be included. For example, engines which utilize exhaust gas recirculation (EGR) preferably include an EGR temperature sensor (ETS) 51 and an EGR flow sensor (EFS) 53.

Applications utilizing a common rail fuel system may include a corresponding fuel pressure sensor (CFPS) 52. Similarly, an intercooler coolant pressure sensor (ICPS) 54 and temperature sensor (ICTS) 56 may be provided to sense the pressure and temperature of the intercooler coolant. According to the present invention, an exhaust back pressure sensor (EBS) 55 is for monitoring exhaust back pressure. The sensor may be placed directly in the exhaust or fluidly coupled to the exhaust as illustrated and described with reference to FIG. 3. Engine 12 also preferably includes a fuel temperature sensor (FTS) 58 and a synchronous reference sensor (SRS) 60, which provides an indication of a specific cylinder in the firing order for engine 12. This sensor may be used to coordinate or synchronize control of a multiple-engine configuration such as used in some stationary generator applications. An EGR cooler and corresponding temperature sensor may also be provided to cool recirculated exhaust gas prior to introduction to the engine intake depending upon the particular application.

Engine 12 may also include an oil level sensor (OLS) 62 to provide various engine protection features related to a low oil level. A fuel restriction sensor (FRS) 64 may be used to monitor a fuel filter and provide a warning for preventative maintenance purposes. A fuel pressure sensor (FPS) 68 provides an indication of fuel pressure to warn of impending power loss and engine fueling. Similarly, a crankcase pressure sensor (CPS) 66 provides an indication of crankcase pressure which may be used for various engine protection features by detecting a sudden increase in crankcase pressure indicative of an engine malfunction.

As one of ordinary skill in the art will appreciate, depending upon the particular application, various sensors may be omitted. In addition, controller 20 preferably includes a number of analog, digital, and/or configurable inputs and outputs which may be used to connect various sensors and/or actuators. Likewise, some applications may use the same wiring harness connectors for alternative placement or retrofitting of sensors and/or actuators. For example, EBS 55 may be connected to any of the sensor inputs in place of a sensor not used in a particular application. In one embodiment, EBS 55 is connected to the wiring harness in place of VSG 69 or in place of an ambient air temperature sensor (not specifically illustrated).

System 10 preferably includes various vehicle sensors/switches 24 to monitor vehicle operating parameters and driver input used in controlling vehicle 14 and engine 12. For example, vehicle sensors/switches 24 may include a vehicle speed sensor (VSS) which provides an indication of the current vehicle speed. A coolant level sensor (CLS) 72 monitors the level of engine coolant in a vehicle radiator. Switches used to select an engine operating mode or otherwise control operation of engine 12 or vehicle 14 may include an engine braking selection switch 74 which preferably provides for low, medium, high, and off selections, cruise control switches 76, 78, and 80, a diagnostic switch 82, and various optional, digital, and/or analog switches 84. ECM 20 also receives signals associated with an accelerator or foot pedal 86, a clutch 88, and a brake 90. ECM 20 may also monitor position of a key switch 92 and a system voltage provided by a vehicle battery 94.

ECM 20 may communicate with various vehicle output devices such as status indicators/lights 96, analog displays 98, digital displays 100, and various analog/digital gauges 102. In one embodiment of the present invention, ECM 20 utilizes an industry standard data link 104 to broadcast various status and/or control messages which may include engine speed, accelerator pedal position, vehicle speed, engine warnings or faults, and the like. Preferably, data link 104 conforms to SAE J1939 and SAE J1587 to provide various service, diagnostic, and control information to other engine systems, subsystems, and connected devices such as display 100. Preferably, ECM 20 includes control logic to reduce engine output when exhaust back pressure exceeds a calibratable threshold according to the present invention to reduce or eliminate the potential for engine damage due to excessive back pressure.

A service tool 106 may be periodically connected via data link 104 to program selected parameters stored in ECM 20 and/or receive diagnostic information from ECM 20. Likewise, a computer 108 may be connected with the appropriate software and hardware via data link 104 to transfer information to ECM 20 and receive various information relative to operation of engine 12, and/or vehicle 14.

Figure 2:
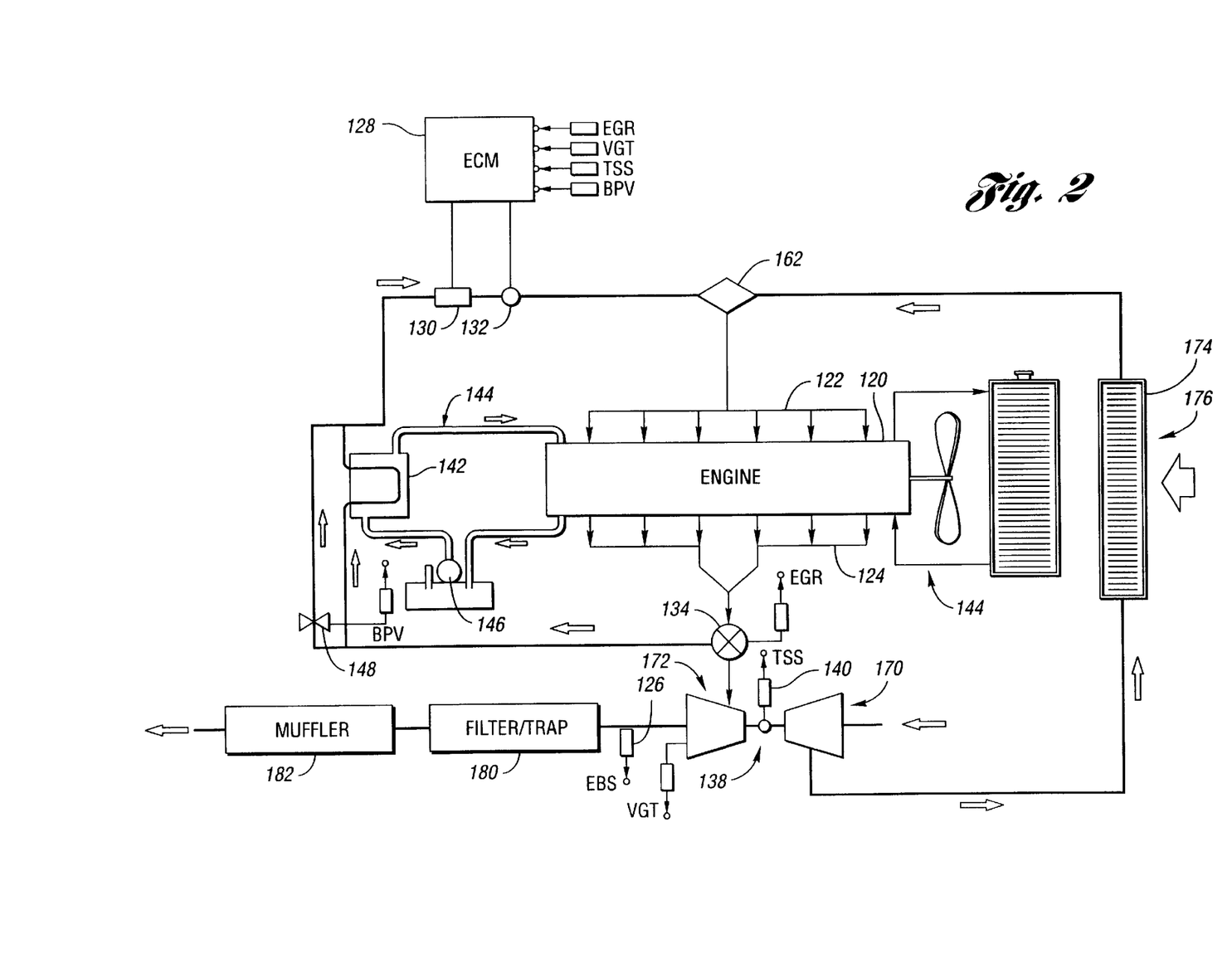
FIG. 2 is a schematic block diagram illustrating an exhaust pressure sensor in a compression ignition internal combustion engine according to one embodiment of the present invention.

FIG. 2 is a block diagram illustrating a representative engine control system with associated exhaust back pressure sensor and emission control devices in communication with an ECM having control logic according to one embodiment of the present invention. Engine 120 includes an intake manifold 122, an exhaust manifold 124, and an exhaust back pressure sensor (EBS) 126. An engine control module (ECM) 128 includes stored data representing instructions and calibration information for controlling engine 120. ECM 128 communicates with various sensors and actuators including EBS 126, EGR flow sensor 130 and EGR temperature sensor 132, for example. ECM 128 preferably controls engine 120 in response to various sensors, including EBS 126, as described in greater detail with reference to FIG. 4. ECM 128 may control one or more engine components or devices in response to increased back pressure indicated by EBS 126 and current operating conditions to reduce or maintain exhaust back pressure at an acceptable level. For example, ECM 128 may control a variable nozzle or variable geometry turbocharger (VGT) 138 and monitor an associated turbo speed sensor 140 and turbo boost sensor as described with reference to FIG. 1. Likewise, engine braking level may be controlled or limited to reduce or prevent excessive exhaust back pressure which may be caused by any of a number of problems.

Engine 120 may also include an EGR flow sensor 130 and temperature sensor 132 downstream of an EGR cooler 142 which is connected to the engine coolant circuit 144, which includes a water or coolant pump 146 for circulating engine coolant. An EGR cooler bypass valve (BPV) 148 may be selectively operated by ECM 128 to control temperature of the EGR flow by diverting none, some, or all of the EGR flow from EGR valve 134 around EGR cooler 142.

In operation, ECM 128 controls engine 120 based on current operating conditions and calibration information to reduce or eliminate excessive exhaust back pressure as monitored by EBS 126. In one preferred embodiment, engine 120 is a 6-cylinder compression-ignition internal combustion engine. ECM 128 includes control logic to monitor current engine control parameters and operating conditions and may limit output speed or torque based on exhaust back pressure exceeding a calibratable threshold. Likewise, various engine systems or subsystems may be controlled in an attempt to prevent excessive back pressure.

During operation of engine 120, intake air passes through compressor portion 170 of VGT 138 which is powered by turbine portion 172 via hot exhaust gasses. Compressed air travels through charge air cooler 174 which is preferably an air-to-air cooler cooled by ram air 176. Charge air passes through cooler 174 to mixer 162 which is preferably a pipe union where it is combined with recirculated exhaust gas based on current engine operating conditions. Exhaust gas exiting engine 120 through exhaust manifold 124 passes through EGR valve 134 where a portion of the exhaust gas may be selectively diverted through EGR cooler 142. Valve 148 is selectively operated to divert a portion (none, some, or all) of the diverted exhaust gas around cooler 142 to adjust the temperature of the recirculated exhaust gas. The EGR flows past EGR flow sensor 130 and temperature sensor 132 to mixing valve 162 where it is combined with compressed charge air. The majority of the exhaust gasses not diverted by EGR valve 134 pass through turbine portion 172 of VGT 138, one or more emission control devices such as a particulate trap or filter 180, and muffler 182 before being exhausted to atmosphere. As particulate filter/trap 180 accumulates particles from the exhaust stream, flow will be impeded and exhaust back pressure between manifold 124 and atmosphere will increase. Preferably, at lease one pressure sensor such as EBS 126 is positioned in the exhaust, or is fluidly coupled to the exhaust or components subjected to exhaust pressure, to provide an indication of exhaust pressure. However, one of ordinary skill in the art may recognize various strategies for estimating or predicting exhaust back pressure from current operating conditions without directly measuring it using a sensor. Likewise, depending on the particular application, the positioning of one or more pressure sensors may vary. For example, to monitor the VGT or engine braking performance, a pressure sensor should be placed upstream of the VGT, i.e. between the exhaust manifold and the VGT, rather than between the VGT and downstream emission control device.

Figure 3:
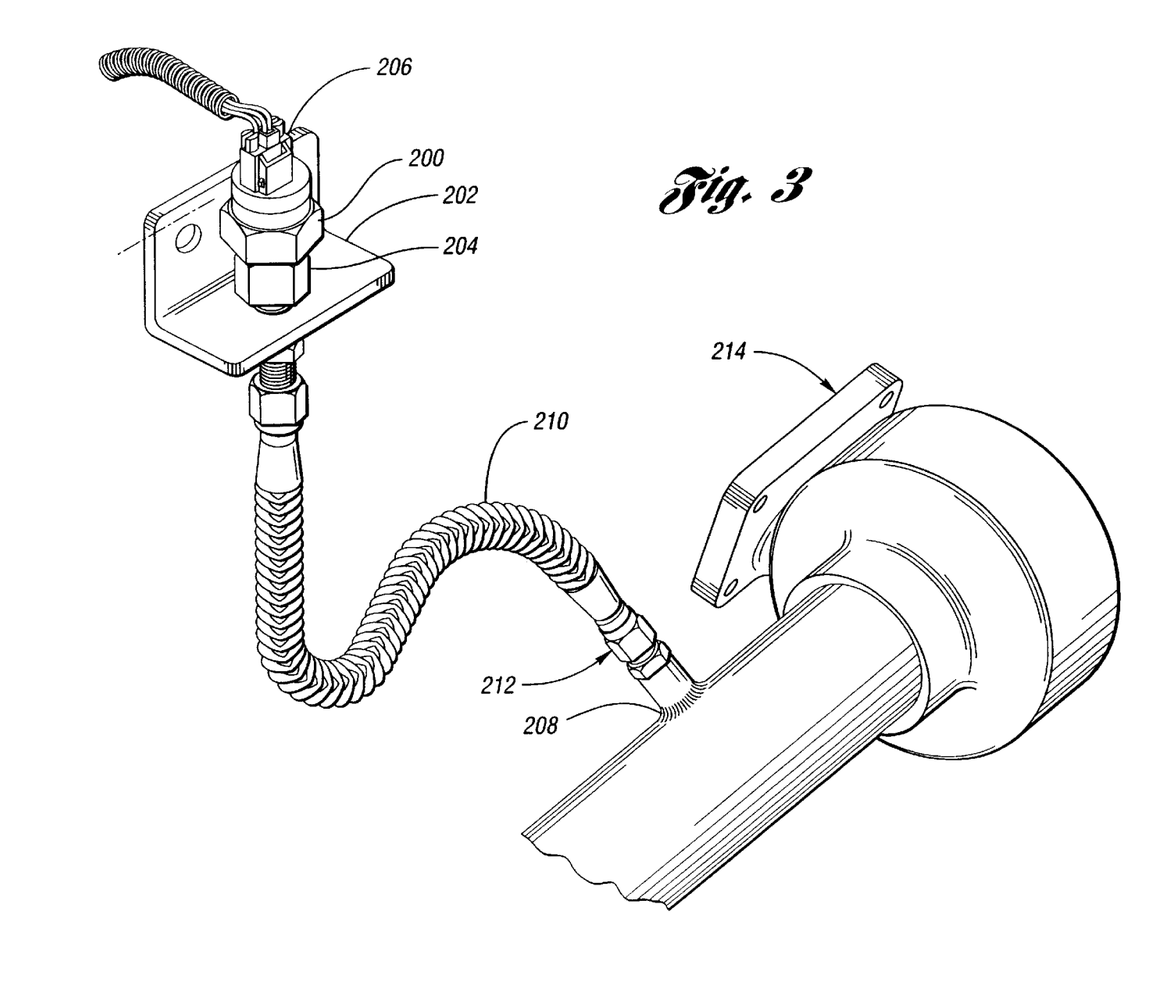
FIG. 3 illustrates placement and mounting for a back pressure sensor used in a system or method for controlling an engine according to one embodiment of the present invention.

FIG. 3 illustrates placement and mounting of a remotely positioned back pressure sensor used in a system or method for controlling an engine according to one embodiment of the present invention. Back pressure sensor 200 may be secured to a mounting bracket 202 using appropriate fasteners 204. Likewise, mounting bracket may be secured to any convenient structure on the vehicle or equipment using conventional fasteners. In one embodiment, mounting bracket 202 is secured to a particulate filter (not specifically illustrated). Sensor 200 is in electrical communication with a controller or monitor via electrical connector 206. In one preferred embodiment, sensor 200 is in electrical communication with the engine/vehicle control module (not specifically illustrated). In addition, sensor 200 is fluidly coupled to a component in the exhaust stream, such as exhaust pipe 208, via a connector or coupling 210 and compression fittings 212, which may be welded to exhaust pipe 208, for example. Connector 210 may be a flexible or rigid pipe or hose, for example, capable of tolerating typical exhaust temperatures and constituents. In this embodiment, sensor 200 is remotely positioned and fluidly coupled to the exhaust downstream of a turbocharger 214. Remote positioning of the exhaust back pressure sensor may be advantageous with respect to lower operating temperatures, less vibration, and/or vehicle packaging considerations. Depending upon the particular application and associated emission control devices, one or more back pressure sensors may be used to measure and monitor pressure at various points in the exhaust as described above.

Figure 4:
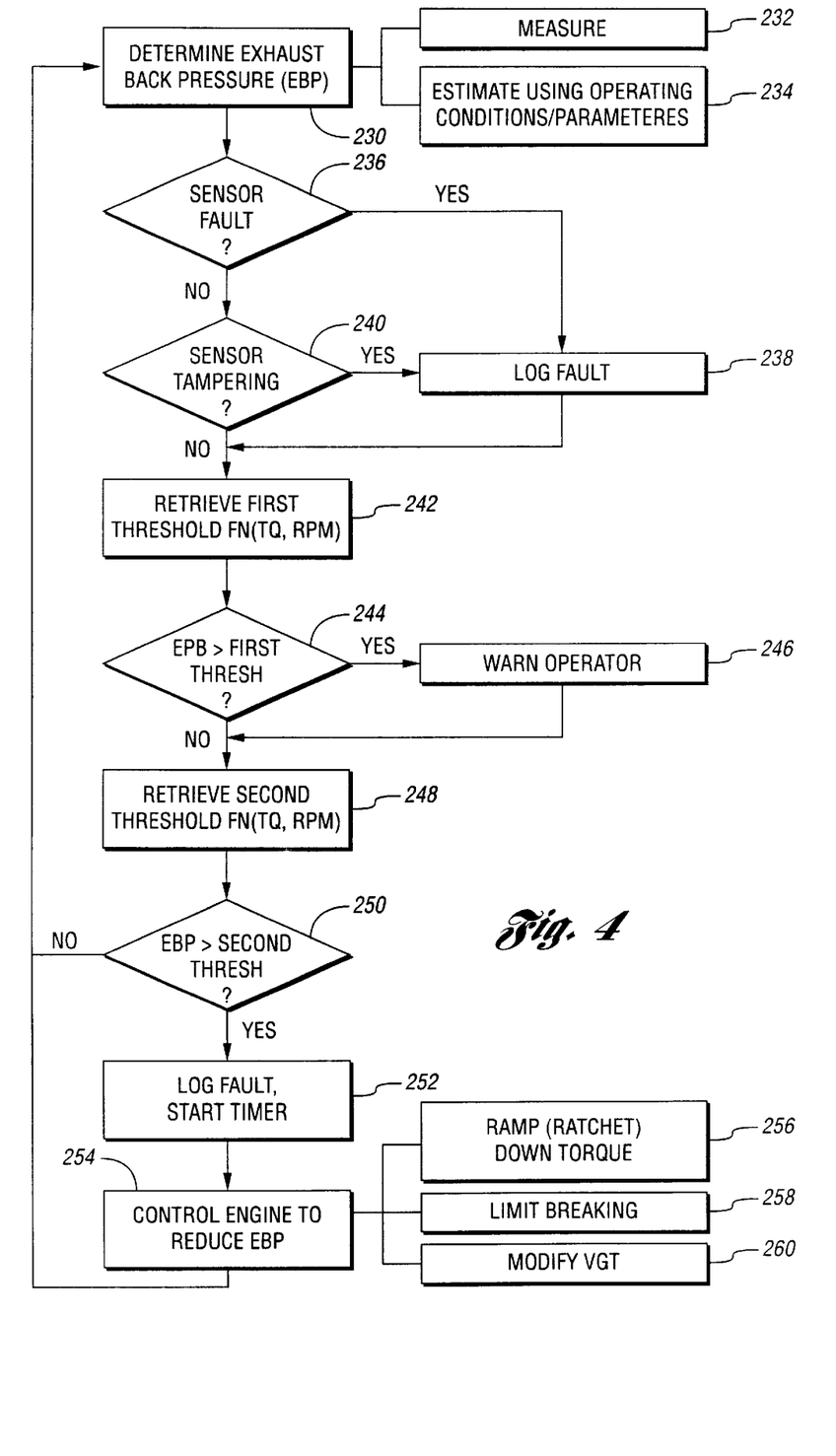
FIG. 4 is a flow chart illustrating operation of a system or method for controlling an engine based on exhaust back pressure according to one embodiment of the present invention.

A flowchart illustrating operation of one embodiment of a system or method for determining phase errors according to the present invention is shown in FIG. 4. As will be appreciated by one of ordinary skill in the art, the flowchart illustrated in FIG. 4 may represent any of a number of known processing strategies which may include event-driven, interrupt-driven, multi-tasking, multi-threading, parallel processing, and the like. As such, various steps or functions illustrated may be performed in the sequence illustrated, in parallel, or in some cases omitted. Likewise, the order of processing is not necessarily required to achieve the objects, features, and advantages of the invention, but is provided for ease of illustration and description. Preferably, control logic as represented in FIG. 4 is implemented primarily in software which is executed by a microprocessor-based computer. Of course, the control logic may be implemented in software, hardware, or a combination of software and hardware. While not explicitly illustrated, one of ordinary skill in the art will recognize that various steps may be performed iteratively.

The present invention provides engine/component protection by monitoring exhaust or engine back pressure, preferably using a back pressure sensor. If back pressure increases above a first calibratable threshold, which is preferably a function of engine speed and torque, the operator is alerted and a fault is logged which can later be retrieved by maintenance personnel, for example. If back pressure increases above a second specified threshold, a fault is logged and corrective action is initiated, which may include reducing available engine torque. Fault detection logic detects a failed sensor while anti-tampering logic detects attempts to defeat the engine protection feature, which modes may include decoupling the sensor from the exhaust stream or replacing the sensor with a circuit element that provides an artificial sensor signal to the engine/vehicle control module.

As illustrated in FIG. 4, block 230 determines exhaust back pressure (EBP) by measuring the back pressure with an associated sensor as represented by block 232 or by estimating back pressure based on current engine operating conditions and/or control parameters as represented by block 234. When a sensor is used, block 236 monitors the sensor signal to detect a sensor failed fault such as a short or open circuit, or sensor voltage out of range (too high or too low). Sensor failed faults may be detected when the ignition is turned to the "on" position whether or not the engine is running in some applications. As such, these sensor checks may be independent of current operating conditions. Alternatively, operating conditions for a stopped engine, such as system voltage, may be used in determining a sensor failed fault in some applications. An open circuit or low voltage fault could indicate a failed sensor or that the sensor has been electrically disconnected, in which case tampering may be indicated. If block 236 detects a sensor failed fault for a predetermined or programmable time, a corresponding code is stored as represented by block 238 and the operator is notified via a display, alarm, or check engine light, for example. In one preferred embodiment, no additional remedial or corrective action is performed in response to a sensor failed fault. This fault preferably becomes inactive if the voltage returns to the normal operating range and the operator signal or alarm is turned off or extinguished.

Block 240 monitors the back pressure sensor signal (when a sensor is used) to detect tampering. Because emission control devices may reduce engine power output, operators may attempt to defeat them to gain engine power and/or additional vehicle speed. The present invention detects some common tampering modes, such as electrically disconnecting the sensor, disconnecting the sensor or fluid coupling from the emission control device or exhaust system so the sensor signal reflects ambient pressure, or connecting a resistor or other circuit to the sensor plug to provide an artificial sensor signal, for example. In general, the present invention monitors the sensor signal to determine if the signal is consistent with current engine operating conditions and control parameters. In one embodiment, the sensor signal is compared to a tampering threshold which is retrieved from a lookup table indexed by engine speed and requested torque, i.e. horsepower. Because exhaust back pressure is directly related to engine speed and torque (i.e. horsepower), the sensor signal should change accordingly. If the sensor has been decoupled from the exhaust or an artificial signal is supplied, the signal will not change as expected and tampering will be indicated. The tampering logic in one embodiment of the present invention detects tampering when the back pressure is below a calibratable tampering threshold while at the same time the engine torque is above another calibratable threshold. When tampering is detected a corresponding a fault is logged as represented by block 238 and the check engine light is turned on for the remainder of the current ignition cycle (i.e. the fault will not go away until the ignition is cycled). In this embodiment, tampering does not cause any additional remedial action or control, such as reducing available engine torque as described below.

The engine back pressure (sensed or estimated) is compared to a corresponding first threshold (preferably retrieved from a look-up table indexed by engine torque and engine speed as represented by block 242) as indicated by block 244. In one preferred embodiment, the first (warning) threshold is indexed by a percentage of requested torque multiplied by engine speed, i.e. a percentage of current engine output power. The index value is preferably filtered to accommodate any delay in the sensor reading. If the engine back pressure exceeds the first threshold for a predetermined or programmable period of time, the operator is warned by an alarm, check engine light, etc. as represented by block 246 and a corresponding fault will be logged. Preferably, the fault will latch for the duration of the current ignition cycle or until cleared by a communications message from a diagnostic or calibration tool and will be stored in a permanent fault memory which can be accessed by maintenance or factory personnel.

A second (remedial action) threshold for the engine back pressure is retrieved from a corresponding look-up table as represented by block 248. The second threshold may also be a function of current engine operating parameters such as engine speed, torque, horsepower, etc., but is preferably an additive offset relative to the first threshold. This strategy reduces calibration effort and requires less memory storage. If the back pressure exceeds the second threshold as indicated by block 250 for a predetermined or programmable period of time, a corresponding fault is logged as represented by block 252 and a fault timer is initiated or incremented. One or more fault timers or accumulators may be provided for each fault to track the time of the actual existence of the fault condition in additoin to the total time the fault remains active, i.e. the duration of the current ignition cycle even though the fault conditions may cease. In addition, corrective or remedial action is preferably taken by controlling the engine or engine components to reduce the back pressure as represented by block 254. This may include reducing available engine torque 256, modifying engine braking 258, or modifying a variable geometry turbocharger (VGT) 260, for example. One of ordinary skill in the art will recognize various additional remedial actions which may be taken to reduce the engine back pressure to an acceptable level.

In one preferred embodiment, an engine power rampdown will be engaged when the second threshold is exceeded and remains active for the duration of the current ignition cycle and logs an associated rampdown fault which is stored in the permanent fault memory. The engine power rampdown limits engine power in a ratcheting fashion. In this way, the engine is allowed to run normally as long as the threshold is not exceeded. As time elapses and the excessive pressure condition is not remedied, by regenerating or replacing a particulate filter, for example, the engine power threshold will continuously decrease to a calibratable minimum value by dynamically setting the torque limit. This feature will ratchet down the torque limit and not allow it to increase for the current ignition cycle. If another engine feature attempts to lower the torque limit (traction control, ABS, etc.), it will be allowed to do so, but once that condition is removed, the back pressure limit will be re-imposed.

In one preferred embodiment, an engine operator can override an engine power rampdown via an appropriate switch or other input. However, the number of operator overrides and/or the duration of each override may be limited depending upon the particular application. For example, a vehicle fleet operator may control various features relative to operator overrides of various engine protection features. Various alternative control strategies are possible which may include whether the operator gets full power back indefinitely, whether the number of overrides are limited, or whether an override retains current power but does not provide full power.

As such, the present invention provides a system and method for reducing or preventing engine damage due to excessive back pressure. Corrective or remedial action are implemented rather than simply indicating that a particular component, such as a particulate filter or trap, has degraded.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for controlling an internal combustion engine, the system comprising:
   a back pressure sensor fluidly coupled to the engine downstream of an exhaust manifold; and
   a controller in communication with the back pressure sensor, the controller monitoring back pressure using the sensor, generating a warning when the back pressure exceeds a first threshold, and controlling the engine to reduce the back pressure when the back pressure exceeds a second threshold.

2. The system of claim 1 wherein the controller controls the engine to reduce available engine torque when the back pressure exceeds the second threshold.

3. The system of claim 1 wherein the controller retrieves the first threshold from memory based on a filtered engine speed and torque.

4. The system of claim 1 wherein the controller compares the back pressure to a third threshold based on current engine operating conditions to detect tampering with the back pressure sensor.

5. A computer readable storage medium having stored data representing instructions executable by a computer to control an internal combustion engine to protect the engine from damage caused by excessive exhaust back pressure, the computer readable storage medium comprising:
   instructions for monitoring back pressure; and
   instructions for controlling the engine to reduce back pressure when the back pressure exceeds a threshold to reduce or prevent engine damage.

6. The computer readable storage medium of claim 5 wherein the instructions for monitoring exhaust pressure comprise instructions for determining exhaust pressure using a pressure sensor fluidly coupled to the exhaust.

7. The computer readable storage medium of claim 5 wherein the instructions for monitoring exhaust pressure comprise instructions for estimating exhaust pressure based on engine operating parameters.

8. The computer readable storage medium of claim 5 wherein the instructions for controlling the engine comprise instructions for reducing available engine torque.

9. The computer readable storage medium of claim 5 wherein the threshold is a function of requested engine output.

10. The computer readable storage medium of claim 5 wherein the threshold is a function of engine speed and torque.

11. The computer readable storage medium of claim 5 further comprising:
    instructions for detecting tampering based on back pressure being less than a second threshold corresponding to current engine operating conditions.

12. A method for controlling an internal combustion engine to protect the engine from damage caused by excessive back pressure, the method comprising:
    monitoring back pressure; and
    controlling the engine to reduce back pressure when the back pressure exceeds a threshold to reduce or prevent engine damage.

13. The method of claim 1 wherein monitoring back pressure comprises measuring back pressure using a pressure sensor fluidly coupled to the exhaust.

14. The method of claim 1 wherein monitoring back pressure comprises estimating back pressure based on engine operating parameters.

15. The method of claim 1 wherein controlling the engine comprises reducing available engine torque.

16. The method of claim 1 wherein the threshold is a function of requested engine output.

17. The method of claim 1 wherein the threshold is a function of engine speed and torque.

18. The method of claim 1 further comprising:
    detecting tampering based on back pressure being less than a second threshold corresponding to current engine operating conditions.

19. The method of claim 18 wherein the current engine operating conditions include engine speed and requested torque.

20. The method of claim 1 wherein controlling the engine comprises repeatedly reducing engine torque while the back pressure exceeds the threshold.

21. A method for controlling an internal combustion engine having an exhaust back pressure sensor fluidly coupled to an exhaust to protect the engine from damage caused by excessive exhaust back pressure, the method comprising:
    monitoring exhaust back pressure based on the sensor;
    determining engine speed and requested torque;
    determining a first exhaust back pressure threshold based on the engine speed and requested torque;
    comparing the exhaust back pressure to the first threshold;
    generating a warning when the exhaust back pressure exceeds the first threshold;
    determining a second exhaust back pressure threshold; and
    controlling the engine to reduce exhaust back pressure when the exhaust back pressure exceeds the second threshold.

22. The method of claim 21 wherein the step of determining a first exhaust back pressure threshold comprises retrieving the first threshold based on a percentage of requested torque and current engine speed.

23. The method of claim 21 further comprising:
    retrieving a third exhaust back pressure threshold based on current engine operating conditions; and
    generating a tampering fault when the exhaust back pressure is less than the third threshold and the engine power exceeds a calibratable threshold.

24. The method of claim 23 wherein the third threshold is determined based on engine speed and torque.

25. The method of claim 21 wherein controlling the engine comprises reducing available engine torque.

26. The method of claim 21 wherein the second threshold is based on the first threshold.

27. The method of claim 21 wherein the step of controlling the engine comprises modifying engine braking.

28. The method of claim 21 wherein the step of controlling the engine comprises controlling a variable geometry turbocharger.

29. The method of claim 21 further comprising:

determining a first fault duration corresponding to time during which the exhaust back pressure exceeds the first threshold; and storing a second fault duration corresponding to time during which the exhaust back pressure exceeds the second threshold.

30. The method of claim 21 further comprising:

generating a first fault when the exhaust back pressure exceeds the first threshold;

latching the first fault for duration of a current ignition cycle;

generating a second fault when the exhaust back pressure exceeds the second threshold;

latching the second fault for duration of the current ignition cycle; and accumulating time associated with the first and second faults.

* * * * *

UNITED STATES PATENT AND TRADEMARK OFFICE
CERTIFICATE OF CORRECTION

PATENT NO.   : 6,708,104 B2                                              Page 1 of 1
DATED        : March 16, 2004
INVENTOR(S)  : Richard Michael Avery, Jr. et al.

It is certified that error appears in the above-identified patent and that said Letters Patent is hereby corrected as shown below:

<u>Column 10,</u>
Lines 8, 11, 14, 16, 18 and 20, delete "1" and insert -- 12 --.

Signed and Sealed this

Twenty-fifth Day of October, 2005

JON W. DUDAS
*Director of the United States Patent and Trademark Office*